United States Patent
Kubota

[11] Patent Number: 5,335,153
[45] Date of Patent: Aug. 2, 1994

[54] INDICATOR LIGHTING UNIT

[75] Inventor: Minoru Kubota, Shizuoka, Japan

[73] Assignee: Yazaki Corporation, Japan

[21] Appl. No.: 43,774

[22] Filed: Apr. 6, 1993

[30] Foreign Application Priority Data

Apr. 7, 1992 [JP] Japan .............. 4-21159[U]

[51] Int. Cl.⁵ .................................... B60Q 1/00
[52] U.S. Cl. .................... 362/240; 362/245
[58] Field of Search .............. 362/240, 29, 245, 235,
362/236, 237; 116/D16, 20, 62.4, 202;
340/4.59, 46; 340/4.59, 46

[56] References Cited

U.S. PATENT DOCUMENTS

| | | | |
|---|---|---|---|
| 1,013,947 | 1/1912 | Neil | 362/240 |
| 4,177,497 | 12/1979 | McCook et al. | 362/29 |
| 4,177,502 | 12/1979 | Hiscock | 362/240 |
| 4,245,279 | 1/1981 | Bouchard et al. | 362/237 |
| 4,345,308 | 8/1982 | Mouyard et al. | 362/245 |
| 5,084,806 | 1/1992 | Nagai | 362/240 |
| 5,245,313 | 9/1993 | Polityka | 340/456 |
| 5,255,172 | 10/1993 | Brandon et al. | 362/240 |

FOREIGN PATENT DOCUMENTS 5782086  5/1982  Japan .
4104743  9/1992  Japan .

*Primary Examiner*—Ira S. Lazarus
*Assistant Examiner*—L. Heyman
*Attorney, Agent, or Firm*—Wigman, Cohen, Leitner & Myers

[57] ABSTRACT

A housing is inserted from the rear side of a case having an indicating plate. The housing has a plurality of illuminating cells corresponding to the indicating plate, and a plurality of bulb insertion holes communicating with the illuminating cells, respectively. A common electrode plate passes through the vicinities of the bulb insertion holes while a plurality of control electrode plates pass through the vicinities of the bulb insertion holes opposite to the common electrode plate. A plurality of bulbs are inserted in and engaged with the bulb insertion holes and are electrically connected to the common electrode plate. One end of each of a plurality of wires are electrically connected to the control electrode plates.

8 Claims, 8 Drawing Sheets

INDICATOR LIGHTING UNIT

BACKGROUND OF THE INVENTION

This invention relates to an indicator lighting unit for an indicator mounted on a vehicle or the like and, in particular, to an indicator lighting unit which is universally adapted to variation of the layout of an indicator and which is easy in exchange of bulbs.

Generally, a dashboard with various instruments often includes various indicators for making various indications by illumination of lamps. For example, a combination meter mounted on a vehicle such as an automobile comprises major instruments such as a speedometer, a tachometer, a fuel gauge, a water temperature gauge, and a trip odometer. In addition to these major instruments, the combination meter further comprises various warning lamps and pilot lamps as indicators of the type described. These indicators are arranged around the above-mentioned major instruments to indicate operating conditions and abnormal conditions of the automobile by illumination of the lamps.

FIG. 1 shows a combination meter 60 for an automobile. A meter case 62 has a display portion 63. Various instruments 66 such as a speedometer are assembled into the display portion 66. In an automatic car, a shift position indicator 61 and other indicators 64 and 65 are assembled also. In order to provide indications, the shift position indicator 61 and the other indicators 64 and 65 are illuminated by illuminating bulbs which are located on the rear side (backlight).

To arrange the illuminating bulbs in the meter case 62, bulb receiving holes are formed in a rear plate of the meter case 62 to receive the illuminating bulbs. The rear plate is generally provided with a printed circuit board on its inner surface to thereby form an electric circuit. Due to presence of the receiving holes, a sufficient circuit space can not be obtained.

In view of the above, the present applicant proposed a display device for a vehicle (Japanese Utility Model Laid Open No. 4-104743) illustrated in FIG. 2. A combination meter 60 has a meter case 62 in which illuminating bulbs are arranged. An illuminating assembly 70 is formed by a combination of the illuminating bulbs, a circuit board, and a lead wire. The illuminating assembly 70 is removably assembled in the meter case 62 through a window 67 formed in the meter case 62.

In the proposed display unit, the illuminating assembly 70 comprises a display portion 71, a lens 72, a multi-deck lamp cover 73 with a plurality of cells, a printed circuit board 74, a lead wire 75, and illuminating bulbs 76 as illustrated in FIGS. 3 and 4. The printed circuit board 74 is attached to the lamp cover 73 through screws 77. A receiving portion 73a projects from the bottom of the lamp cover 73. A top plate of the lamp cover 73 is provided with a stopper 73b and an opening 73c for outwardly directing the lead wire 75.

The illuminating assembly 70 is inserted in the meter case 62 through the window 67 formed in the top plate of the meter case 62. The illuminating assembly 70 is properly positioned by bring the receiving portion 73a and the stopper 73b into contact with a guide portion 68 of the meter case 62 and an edge of the window 67, respectively.

With this structure, a printed circuit board can be formed on an outer surface 62a of the meter case 62. A sufficient circuit space is obtained for the printed circuit board because it is unnecessary to provide bulb receiving holes or an electric circuit for the illuminating bulbs 76 on the meter case 62. On the other hand, a plurality of electric circuits for the illuminating bulbs 78 can be formed on the printed circuit board 74 attached to the illuminating assembly 70. The lead wire 75 is drawn out through the opening 78c formed on the top plate of lamp cover 78 of the illuminating assembly 70.

With the display device for a vehicle already proposed by the present applicant, the assembly 70 can be removed from the meter case 62 through the window 62 in order to exchange exhausted one or ones of the illuminating bulbs 76. Thus, efficiency in exchange work is excellent.

However, with the above-mentioned display device for a vehicle, the electric circuit has a route passing through a wire harness, a flexible circuit board, and the bulb. Since a configuration of the meter case is different in dependence upon a type of an automobile, it is necessary to change the shape and the number of the flexible circuit boards. As described, the electric circuit extends over a long distance from the wire harness through the flexible circuit board to the bulb. The layout of the indicator often makes it difficult to design the flexible circuit board.

SUMMARY OF THE INVENTION

It is an object of this invention to provide an indicator lighting unit which can be mounted in an indicator irrespective of the type of the indicator and which has a simple structure by simplification of power supply to bulbs.

In order to achieve the above-mentioned object, this invention provides an indicator lighting unit which is inserted from the rear side of a case having an indicator and which is for illuminating the indicator from the rear side of the indicator to thereby provide indications, said indicator lighting unit comprising:

a housing inserted from the rear side of the case, the housing having a plurality of illuminating cells corresponding to the indicator and a plurality of bulb insertion holes communicating with the illuminating cells, respectively;

a common electrode plate passing through the vicinities of the bulb insertion holes;

a plurality of control electrode plates passing through the vicinities of the bulb insertion holes;

a plurality of bulbs inserted in and engaged with the bulb insertion holes and electrically connected to the common electrode plate and the control electrode plates; and a plurality of wires having one ends electrically connected to the common electrode plate or the control electrode plates.

In the indicator lighting unit according to this invention, the common electrode and the control electrodes are accommodated in a casing attached to top ends of wire harnesses. With this structure, the indicator lighting unit can be adapted to various types of indicators by simply changing the arrangement of the electrodes. When used as a combination meter for an automobile, the indicator lighting unit can be easily modified in accordance with a type and a grade of the automobile. Since the common electrode and the control electrodes are accommodated in the casing, a structure is very simple and power supply to the bulbs is facilitated.

DESCRIPTION OF THE PREFERRED EMBODIMENT

An embodiment of this invention will be described with reference to the accompanying drawings hereinafter.

Figure 1:
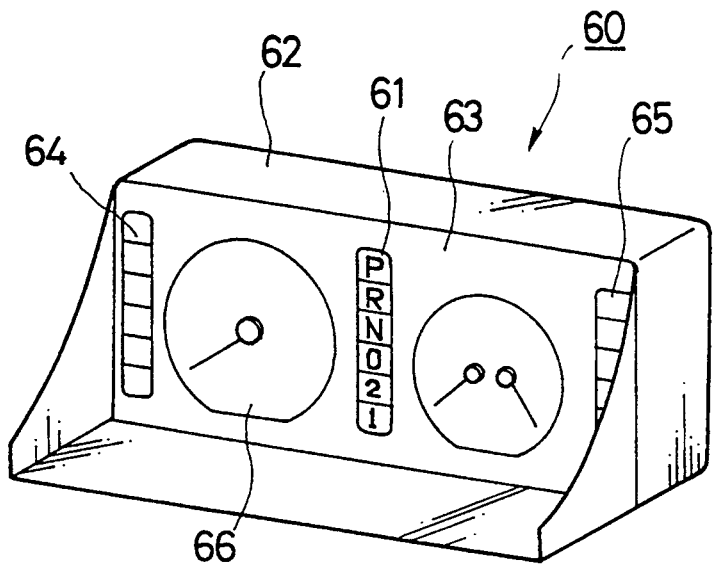
FIG. 1 is a perspective view of a conventional combination meter when seen from a front side.
Figure 2:
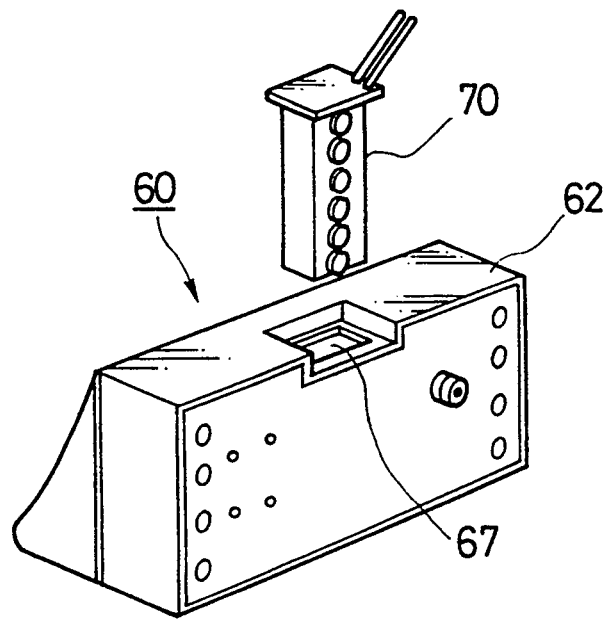
FIG. 2 is a perspective view of a whole structure of a conventional display device for a vehicle already proposed by the present applicant.
Figure 3:
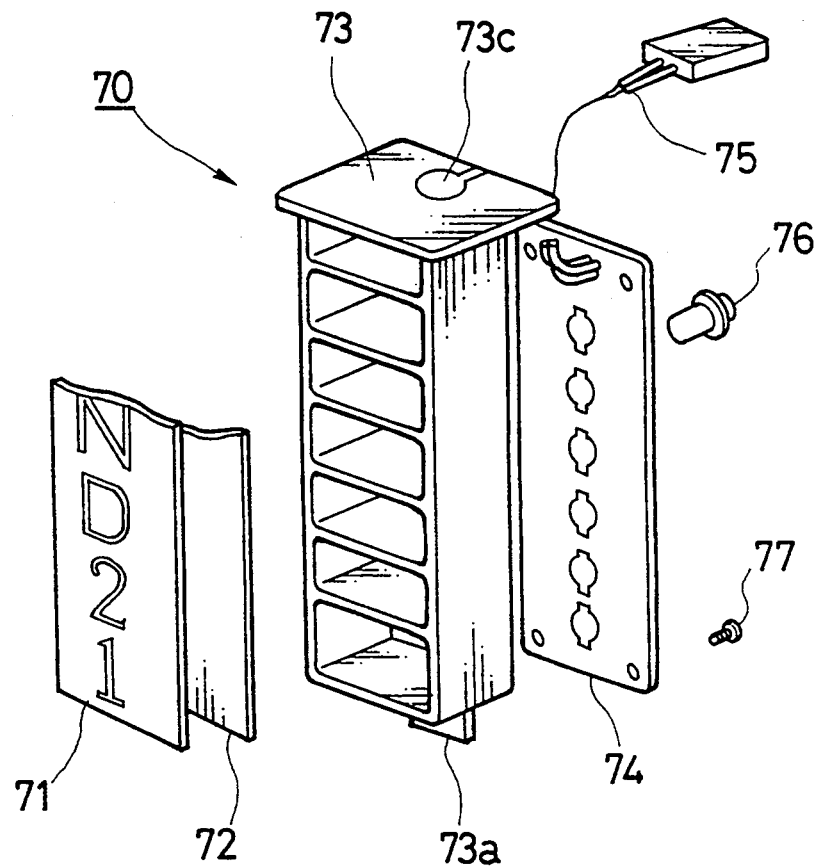
FIG. 3 is an exploded perspective view of the display device for a vehicle illustrated in FIG. 2.
Figure 4:
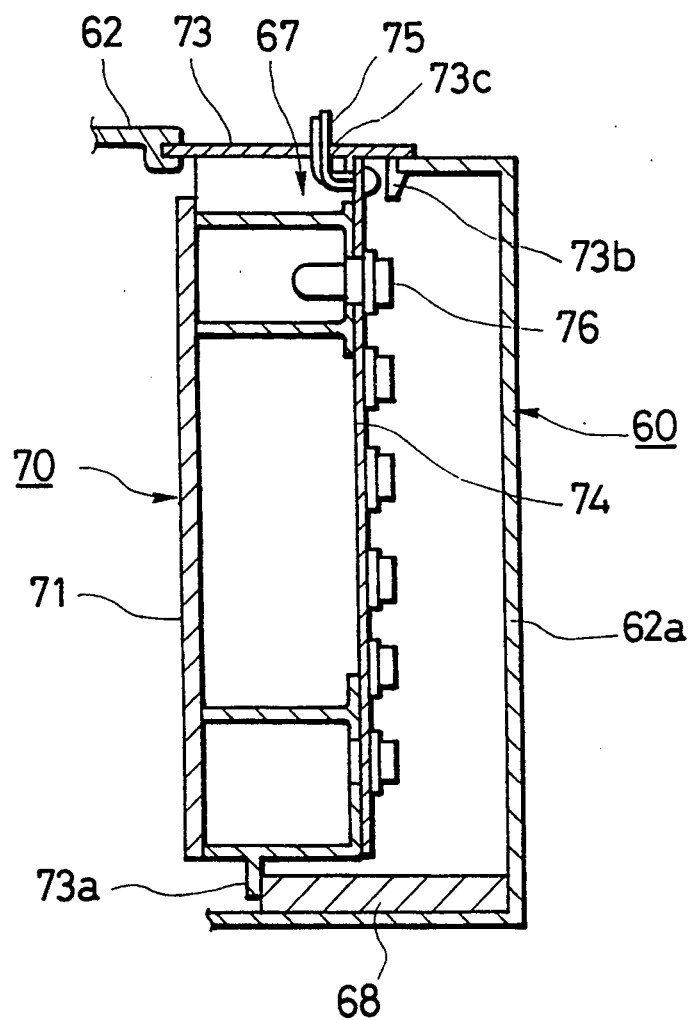
FIG. 4 is a longitudinal sectional view of the display device for a vehicle illustrated in FIG. 2.
Figure 5:
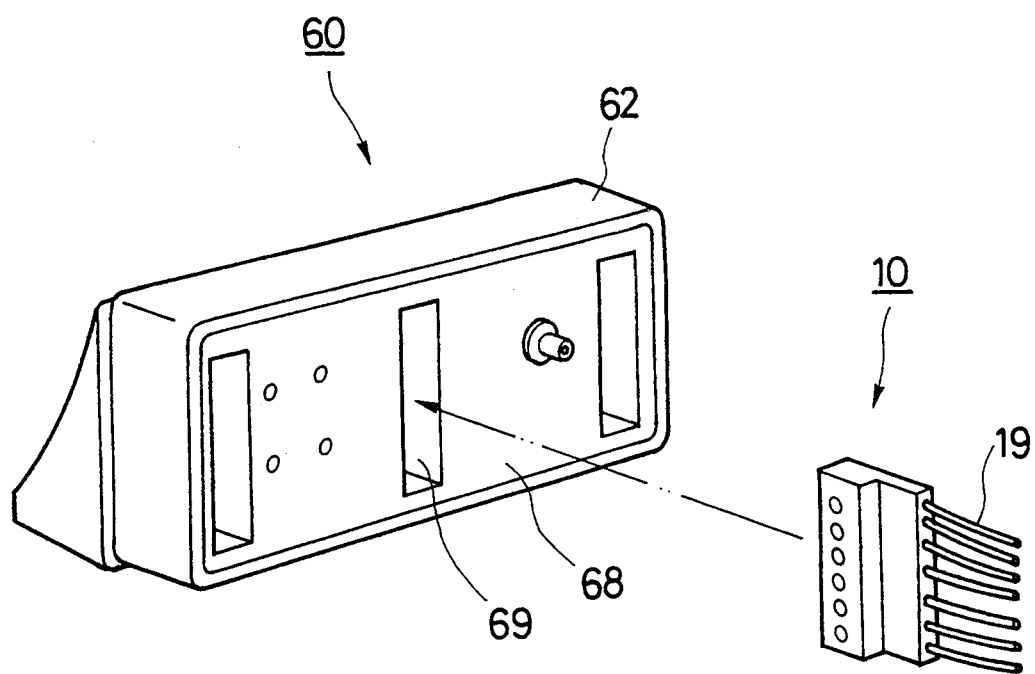
FIG. 5 is a perspective view of a meter case and an indicator lighting unit according to an embodiment of this invention when seen from a rear side.

An indicator lighting unit according to this invention is for use in an indicator which is assembled in a display device to provide indications by illumination of lamps. The indicator lighting unit is for illuminating the indicator from the rear side thereof. The indicator lighting unit is inserted into the display device to be located at the rear side of the indicator. FIG. 5 shows an embodiment of the indicator lighting unit according to this invention which is mounted on a combination meter of an automobile. The combination meter 60 comprises a meter case 62. The meter case 62 has a rear plate 68 provided with at least one illumination recess 69. The indicator lighting unit 10 is inserted into the illumination recess 69 formed at the back of the indicator. The indicator lighting unit according to this invention is directly connected to the top ends of wire harnesses 19.

Referring to FIGS. 6 through 10, description will be made in detail as regards the indicator lighting unit according to this invention which is mounted on the combination meter 60 illustrated in FIG. 5.

Figure 6:
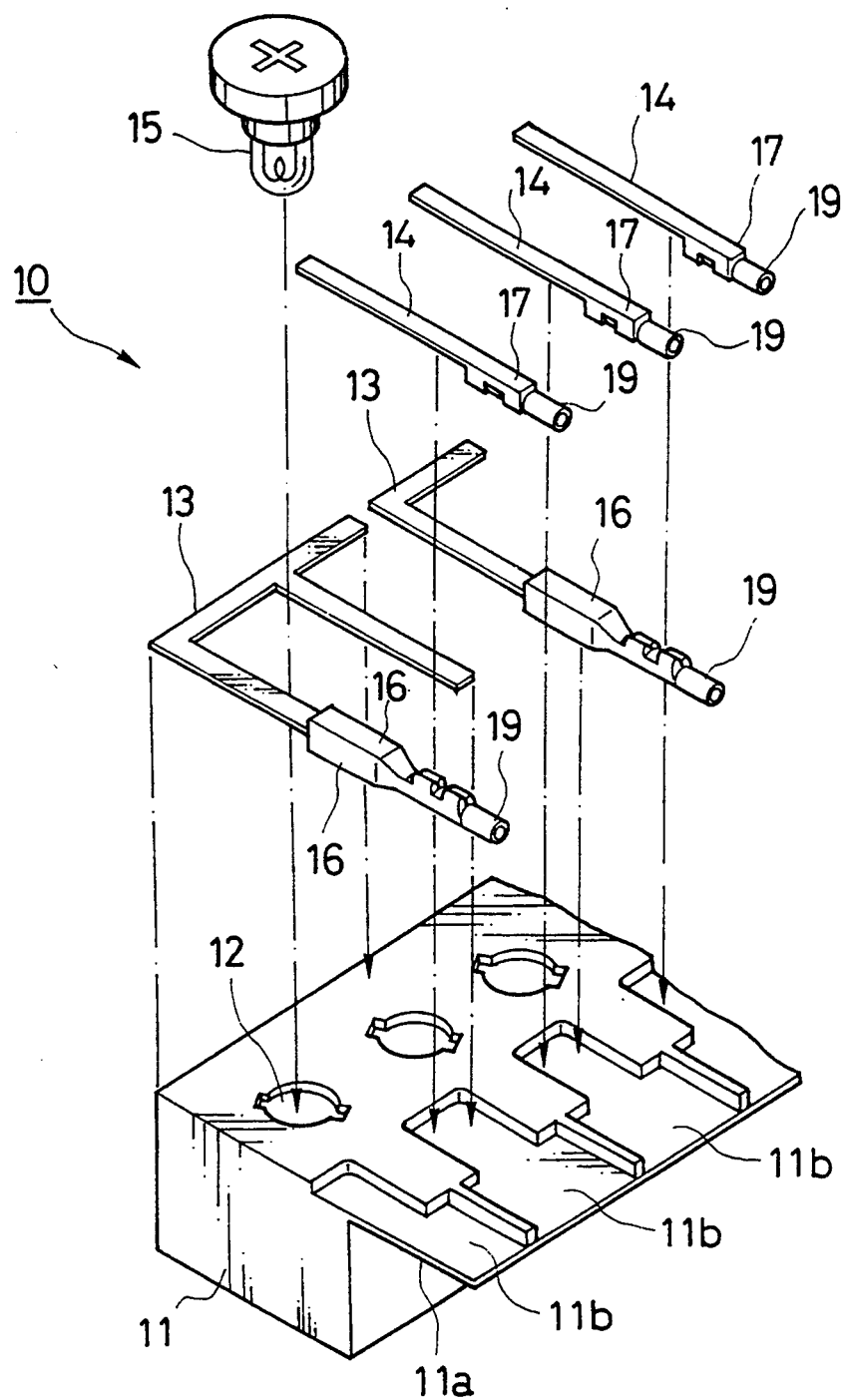
FIG. 6 is an exploded perspective view of a part of the indicator lighting unit according to an embodiment of this invention.

FIG. 6 is an exploded perspective view for describing a structure of the indicator lighting unit 10 according to an embodiment of this invention. The indicator lighting unit 10 essentially comprises a housing 11 provided with illuminating bulb insertion holes 12, at least one common electrode plate (bus bar) 13, a plurality of control electrode plates 14 separate from one another, illuminating bulbs 15 fitted in the holes 12, and the wire harnesses 19. The housing 11 has illuminating cells corresponding to the indicator to be illuminated. The holes 12 are formed on a side surface of the housing 11 to communicate with the respective cells. Around the holes 12, at least one common electrode plate 13 is attached to pass through the vicinity of each hole 12. The control electrode plates 14 separate from one another are attached opposite to the common electrode plate 13 with respect to the holes 12. The illuminating bulbs 15 are inserted into the holes 12 and then rotated to be engaged. When engaged, the electrodes of the illuminating bulbs 15 are electrically connected to the common electrode plate 13 and the control electrode plates 14.

In this embodiment, the common electrode plate 13 is coupled to female terminals 16 formed at the ends of the wire harnesses 19 for electrical connection. The control electrode plates 14 are formed by extending male terminals 17 formed at the top ends of the wire harnesses 19. The female terminals 16 and the male terminals 17 are mounted in recesses 11b of a flange 11a formed on the side surface of the housing 11. The wire harnesses 19 connected to the female terminals 16 are connected, at the other ends, to a positive or a negative power supply. The wire harnesses 19 connected to the male terminals 17 are connected, at the other ends, to a control circuit for controlling illumination of the indicator. Under control of the control circuit, the bulbs 15 are energized and deenergized to be turned on and off.

Figure 7:
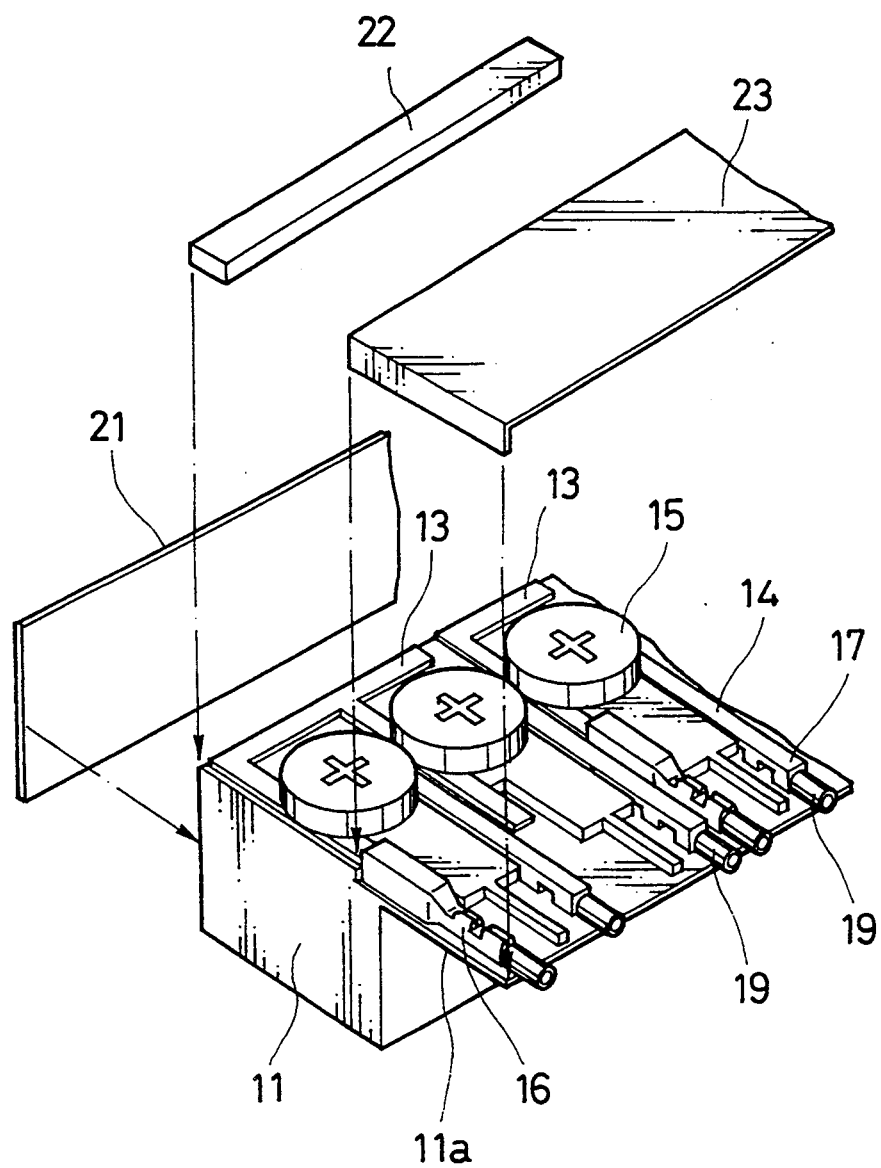
FIG. 7 is an assembled perspective view of the part of the indicator lighting unit illustrated in FIG. 6.
Figure 8:
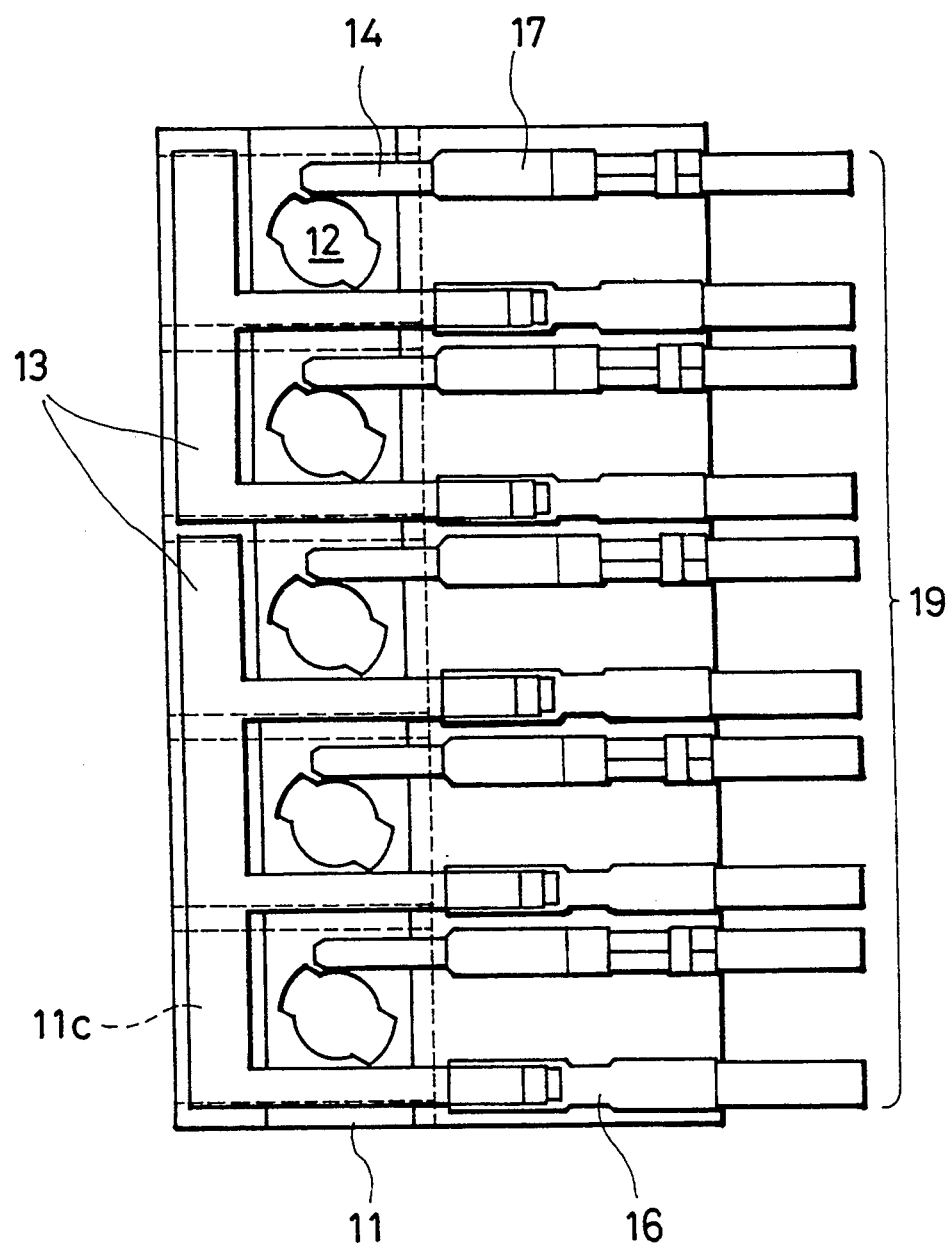
FIG. 8 is a plan view of the indicator lighting unit illustrated in FIG. 6.

Referring to FIG. 7, the common electrode plate 13, the control electrode plates 14, the illuminating bulbs 15, the female terminals 16, and the male terminals 17 are assembled in the housing 11 illustrated in FIG. 6. Furthermore, a lens 21 is attached to the indicator lighting unit 10 to cover the cells of the housing 11. A bar 22 for fixing the electrodes is attached on the common electrode 13. A cover 23 is attached on the female terminals 16 and the male terminals 17. FIG. 8 is a plan view of FIG. 7 with the illuminating bulbs 15 removed. FIG. 8 shows the cells 11c formed in the housing 11.

Figure 9:
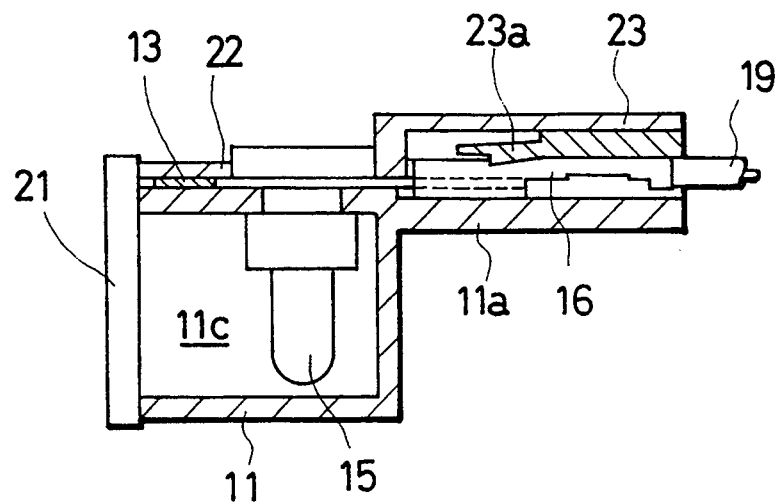
FIG. 9 is a longitudinal sectional view of FIG. 7.

The cover 23 may preliminarily integrally be formed with the housing 11. In this event, the common electrode plate 13 alone is fixed on the housing 11. The female terminals 16 and the male terminals 17 with the control electrode plates 14 are later inserted into a space between the cover 23 and the flange 11a. In this case, engaging lances 23a are formed inside the cover 23 as shown in FIG. 9. The engaging lances 23a are engaged with the female terminals 16 inserted between the cover 23 and the flange 11a while the female terminals 16 are connected to the common electrode plate 13. Likewise, the male terminals 17 inserted between the cover 23 and the flange 11a are engaged with the engaging lances 23a at predetermined positions, as shown in FIG. 10.

Figure 10:
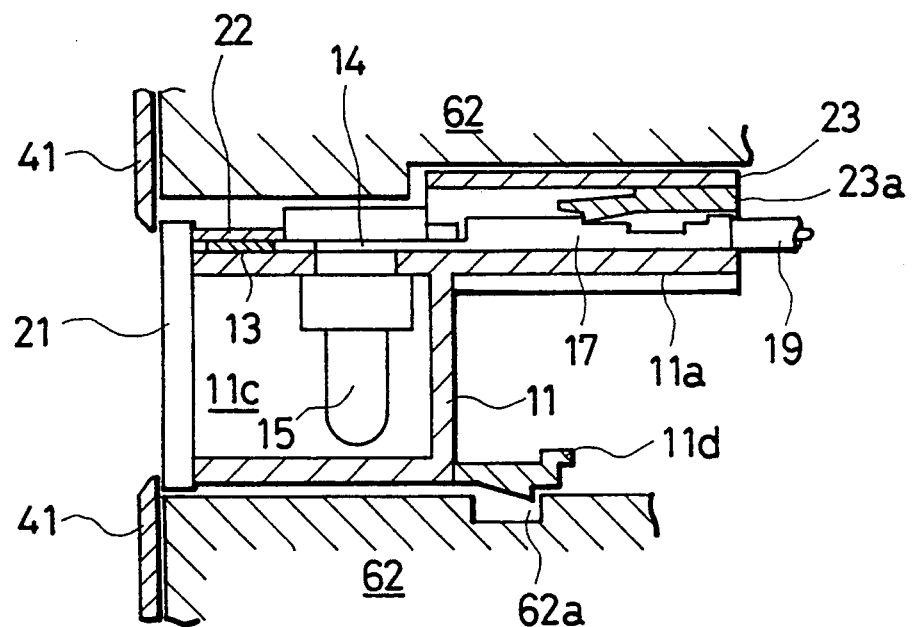
FIG. 10 is a longitudinal sectional view of the indicator lighting unit illustrated in FIG. 7 when assembled in the meter case.

FIG. 10 shows an engagement structure of the indicator lighting unit 10 in the combination meter 60. Herein, an engaging lance 11d is formed on the bottom of the housing 11 at the rear side. When the housing 11 is inserted and reaches a predetermined position, the engaging lance 11d is engaged with an engaging recess 62a formed on the meter case 62. End plates 41 are formed on a display portion of the combination meter 60.

The indicator lighting unit 10 having the above-mentioned structure can be easily mounted and removed through the rear surface of the meter case 62 as illustrated in FIG. 5. Accordingly, exchange of burn out bulbs and maintenance are easy. In case when the layout of the indicator is different, the indicator lighting unit 10 can be readily modified by changing the arrangement of the common electrode and the control electrodes.

With recent development in miniaturization of the meter, the display device of the meter becomes small. In this connection, the sizes of the indicators are substantially equal even if the types of the meters are different. To adapt the indicator lighting unit for various types of the meters, the size and the pitch of the indicator are standardized while the indicator lighting units of several sizes (the number of bulbs are different) are prepared. Thus, a desired one of the indicator lighting units can be selected for a particular type of the indicator. Then, bulb terminals are inserted into the indicator. It is thus possible to universally use the indicator lighting unit irrespective of the type of the indicator.

What is claimed is:

1. An indicator lighting unit which is inserted from a rear side of a case having an indicating plate and which is for illuminating said indicating plate from the rear side thereof to provide indications, said indicator lighting unit comprising:
   a one-piece modular housing inserted from the rear side of said case, said housing having a plurality of illuminating cells corresponding to said indicating plate and a plurality of bulb insertion holes communicating with said illuminating cells, respectively;
   a common electrode plate passing through the vicinities of said bulb insertion holes, said common electrode plate being directly mounted on said housing;
   a plurality of control electrode plates passing through the vicinities of said bulb insertion holes, said control electrode plates being directly mounted on said housing;
   a plurality of bulbs inserted in and engaged with said bulb insertion holes and electrically connected to said common electrode plate and said control electrode plates;
   a first wire having one end electrically connected to said common electrode plate; and
   a plurality of second wires each having one end thereof electrically connected to said control electrode plates; whereby said housing may be easily mounted and removed from said case.

2. An indicator lighting unit as claimed in claim 1, wherein:
   said common electrode plate is connected to said first wire through a first terminal, said control electrode plates being formed by extending second terminals connected to said second wires.

3. An indicator lighting unit as claimed in claim 2, wherein:
   said first wire is connected at the other end to a power supply, said second wires connected to said second terminals being connected at the other end to a control circuit for controlling illumination of said indicator.

4. An indicator lighting unit as claimed in claim 2, further comprising a cover for covering said first and said second terminals.

5. An indicator lighting unit as claimed in claim 4, wherein:
   said cover is integrally formed with said housing, said common electrode plate being preliminarily arranged in the vicinities of said bulb insertion holes of said housing, said first terminal being later inserted between said cover and said housing to be connected to said common electrode plate, said second terminals being later inserted between said cover and said housing to be located in the vicinities of said bulb insertion holes.

6. An indicator lighting unit as claimed in claim 5, wherein:
   said cover has engaging lances for holding said first and said second terminals.

7. An indicator lighting unit as claimed in claim 1, wherein:
   said housing has a stopper to be engaged with said case when said housing is inserted into said case.

8. An indicator lighting unit which is inserted from a rear hole of a meter case with an indicating plate and which is for illuminating said indicating plate from a rear side of said indicating plate to thereby provide indications, said indicator lighting unit comprising:
   a one-piece modular housing inserted from the rear hole of said meter case, said housing having a plurality of illuminating cells corresponding to said indicating plate and a plurality of bulb insertion holes communicating with said illuminating cells, respectively;
   a common electrode plate passing through the vicinities of said bulb insertion holes, said common electrode plate being directly mounted on a wall of said housing;
   a plurality of control electrode plates passing through the vicinities of said bulb insertion holes, said control electrode plates being directly mounted on the wall of said housing;
   a plurality of bulbs inserted in and engaged with said bulb insertion holes and electrically connected to said common electrode plate and said control electrode plates;
   a terminal electrically connected to said common electrode plate;
   a first wire having one end electrically connected to said common electrode plate through said terminal; and
   a plurality of second wires each having one end electrically connected to said control electrode plates.

* * * * *